(12) United States Patent
Sato et al.

(10) Patent No.: US 10,182,626 B2
(45) Date of Patent: Jan. 22, 2019

(54) BODY ORNAMENT MANUFACTURING METHOD, BODY ORNAMENT-MOLDING DIE AND BODY ORNAMENT

(71) Applicant: BISO CO., Ltd., Yamanashi (JP)

(72) Inventors: Kouichi Sato, Yamanashi (JP); Yukio Sato, Yamanashi (JP)

(73) Assignee: BISCO CO., Ltd., Yamanashi (JP)

( * ) Notice: Subject to any disclaimer, the term of this patent is extended or adjusted under 35 U.S.C. 154(b) by 70 days.

(21) Appl. No.: 15/314,596

(22) PCT Filed: Jul. 28, 2015

(86) PCT No.: PCT/JP2015/071314
§ 371 (c)(1),
(2) Date: Nov. 29, 2016

(87) PCT Pub. No.: WO2016/039030
PCT Pub. Date: Mar. 17, 2016

(65) Prior Publication Data
US 2017/0196320 A1     Jul. 13, 2017

(30) Foreign Application Priority Data
Sep. 8, 2014   (JP) .................... 2014-182058

(51) Int. Cl.
*A44C 9/00*      (2006.01)
*A44C 27/00*     (2006.01)
(Continued)

(52) U.S. Cl.
CPC .............. *A44C 27/003* (2013.01); *A44C 9/00* (2013.01); *A44C 9/02* (2013.01); *A44C 17/02* (2013.01);
(Continued)

(58) Field of Classification Search
CPC ... A44C 27/003; A44C 27/002; A44C 25/001; A44C 17/02; A44C 9/02; A44C 9/00;
(Continued)

(56) References Cited

U.S. PATENT DOCUMENTS 2,399,705 A * 5/1946 Ziehl ...................... C09C 1/622
                                                              106/403
5,881,795 A    3/1999 Uptain
(Continued)

FOREIGN PATENT DOCUMENTS

JP    2003-277611 A    10/2003
JP    2004-018705 A     1/2004
(Continued)

OTHER PUBLICATIONS

International Search Report dated Nov. 10, 2015 in corresponding Application No. PCT/JP2015/071314; 2 pgs.
(Continued)

*Primary Examiner* — Richard Chang
(74) *Attorney, Agent, or Firm* — Maier & Maier, PLLC

(57) ABSTRACT

Silicone is placed between an upper die and an injection-pressing rubber-lid upper die, and the silicone injection passage is pressurized by the injection-pressing rubber-lid upper die. With this, the silicone is caused to flow into an injection port through the silicone injection passage. Then, sequentially through the injection port and the disc silicone-flow passage, the silicone is caused to flow toward an inner periphery of a silicone injection space. Further, the silicone flows between both circumferential sides of the silicone-flow deflection region. In this way, the silicone flows in a peculiar manner in conformity with a shape of the silicone-flow deflection region.

2 Claims, 13 Drawing Sheets

(51) Int. Cl.
| | |
|---|---|
| *A44C 17/02* | (2006.01) |
| *A44C 25/00* | (2006.01) |
| *B22F 3/02* | (2006.01) |
| *B22F 9/04* | (2006.01) |
| *B29C 45/00* | (2006.01) |
| *B29C 45/27* | (2006.01) |
| *B29C 45/57* | (2006.01) |
| *A44C 9/02* | (2006.01) |
| *B29K 83/00* | (2006.01) |
| *B29K 105/16* | (2006.01) |
| *B29K 505/14* | (2006.01) |
| *B29L 31/00* | (2006.01) |

(52) U.S. Cl.
CPC .......... *A44C 25/001* (2013.01); *A44C 27/002* (2013.01); *B22F 3/02* (2013.01); *B22F 9/04* (2013.01); *B29C 45/0001* (2013.01); *B29C 45/0025* (2013.01); *B29C 45/2708* (2013.01); *B29C 45/57* (2013.01); *B22F 2009/045* (2013.01); *B22F 2301/255* (2013.01); *B22F 2302/45* (2013.01); *B22F 2998/10* (2013.01); *B29C 2045/0027* (2013.01); *B29C 2045/2716* (2013.01); *B29K 2083/005* (2013.01); *B29K 2105/16* (2013.01); *B29K 2505/14* (2013.01); *B29L 2031/743* (2013.01)

(58) Field of Classification Search
CPC . B29C 45/2708; B29C 45/57; B29C 45/0025; B29C 45/0001; B29C 2045/2716; B22F 9/04; B22F 3/02; B22F 2009/045; B29K 2083/005

See application file for complete search history.

(56) References Cited

U.S. PATENT DOCUMENTS

| | | | |
|---|---|---|---|
| 8,345,404 B2 * | 1/2013 | Nozoe | H01C 1/146 361/212 |
| 2008/0041099 A1 * | 2/2008 | Hirata | A44C 5/0023 63/15 |
| 2008/0229783 A1 | 9/2008 | Hashimian | |

FOREIGN PATENT DOCUMENTS

| | | |
|---|---|---|
| JP | 2005-088076 A | 4/2005 |
| JP | 2006-265105 A | 10/2006 |
| JP | 3183612 U | 5/2013 |
| KR | 10-2006-0125132 A | 12/2006 |

OTHER PUBLICATIONS

Office Action dated Jan. 10, 2018 in corresponding Chinese Application No. 201580028872.1; 9 pages.

Search Report dated Nov. 7, 2017 in corresponding European Application No. 15840646.2; 7 pages.

* cited by examiner

BODY ORNAMENT MANUFACTURING METHOD, BODY ORNAMENT-MOLDING DIE AND BODY ORNAMENT

TECHNICAL FIELD

This invention relates to a personal ornament manufacturing method that allows a collet having a jewel attached thereto to be securely fitted to a preform made of silicone rubber, and is used for molding a one-size-fits-all ring that has a luxurious appearance and utilizes stretchability of the silicone rubber preform, the one-size-fits-all ring being molded by forming bare metals of precious metals that are used for precious-metal accessories, such as gold, platinum, silver, and alloys of those precious metals into powder, or by forming, for example, a bare metal of copper into powder, and then mixing the powder uniformly into the silicone rubber not containing pigment. This invention relates also to a personal ornament molding die set and a personal ornament.

BACKGROUND ART

Hitherto, as disclosed in Japanese Patent Application Laid-open No. 2004-18705 (refer to Patent Literature 1) and Japanese Patent Application Laid-open No. 2006-265105 (refer to Patent Literature 2), there have been known ornaments formed of a silicone rubber preform, which are utilized as health or cosmetic jewelry capable of generating far-infrared rays or negative ions by mixing, for example, tourmaline, germanium, silica, and magnetic fields with each other, and capable of providing an effect of maintaining a good physical condition, or capable of providing a cosmetic effect.

Further, in Japanese Patent Application Laid-open No. 2003-277611 (refer to Patent Literature 3), there have been proposed a rubber preform and an accessory formed of this rubber preform, such as a bracelet, the rubber preform being obtained by adding and dispersing pearl pigment particles obtained by covering outer peripheries of mica flakes with titanium oxide or iron oxide into a layer of a matrix of light transmissive silicone rubber such that a pearl tone can be obtained, whereby an arbitrary base color can be expressed.

However, enhancement of commercial value by fitting a collet to the related-art accessories formed of the rubber preform has not been taken into consideration at all. In addition, attempts to enhance ornamental characteristics of those accessories have been made only by adding, for example, pigment. Under such circumstances, it has been almost impossible to provide luxurious accessories.

In order to solve such problems, as disclosed in Japanese Utility Model Registration No. 3,183,612 (Patent Literature 4), the applicant of the present invention has been capable of proposing a highly-value-added accessory that allows the collet to be easily and securely fitted thereto, specifically, has proposed an accessory that is not only highly useful as a one-size-fits-all ring but also has highly luxurious ornamental characteristics obtained by blending bare metal powder.

Patent Literature 1: Japanese Patent Application Laid-open No. 2004-18705
Patent Literature 2: Japanese Patent Application Laid-open No. 2006-265105
Patent Literature 3: Japanese Patent Application Laid-open No. 2003-277611
Patent Literature 4: Japanese Utility Model Registration No. 3,183,612

SUMMARY OF INVENTION

Technical Problem

Incidentally, a method of manufacturing the above-described one-size-fits-all ring includes mixing the bare metal powder into silicone such that a peculiar pattern is formed. However, when the bare metal is merely ground into powder and then mixed into the silicone, the gold is agglomerated. Thus, in order to color the silicone in gold through the mixing, the bare metal needs to be used in a large amount. As a result, there arises a problem of cost increase.

Further, depending on the manufacturing method, the imitation of the above-described one-size-fits-all ring significantly varies. As a result, aesthetic properties are affected.

Still further, with regard to the peculiar pattern of the above-described one-size-fits-all ring, the pattern being formed by mixing the bare metal powder into the silicone, the imitation significantly varies depending on the manufacturing method. As a result, the aesthetic properties are affected.

In particular, at the time of forming a shank of the above-described one-size-fits-all ring with a die set, burrs conforming to a slit at the time of separating two upper and lower dies from each other are formed along an outer peripheral surface. As a result, there arises a problem in that aesthetic appearance is impaired.

In addition, how such silicone rings are manufactured stably at a high yield is also important.

The present invention has been made in view of the related-art problems as described above, and has an object to provide a personal ornament manufacturing method that allows a silicone ring excellent in aesthetic property to be molded with use of a small amount of metal stably at a high yield, and to provide a personal ornament molding die set and a personal ornament.

Solution to Problem

In order to solve the related-art problems as described above, and to achieve the above-mentioned object, according to the present invention, there is provided a personal ornament manufacturing method including: a first step of forming metal flakes through gold beating of metal; a second step of forming the metal flakes obtained in the first step into metal powder; a third step of adding the metal powder obtained in the second step into silicone, and of mixing the metal powder and the silicone with each other through kneading with use of a roll; a fourth step of injecting the silicone obtained in the third step into a die set; and a fifth step of taking out, from the die set in which the silicone is injected in the fourth step, a personal ornament made of the silicone, the die set including: a substantially ring-shaped silicone injection space; an injection passage including an injection port located substantially at a vicinity of a center of an inner circle of the substantially ring-shaped silicone injection space, and configured to allow the silicone to be injected through the injection port; a disc flow passage having a substantially disc-like shape expanding from the injection port toward the inner circle, and a thickness smaller than a thickness of the substantially ring-shaped silicone injection space; and a silicone-flow deflection region that is located in the substantially ring-shaped silicone injection space and deflects the silicone, the fourth step including: causing the silicone obtained in the third step to flow into the disc flow passage sequentially through the injection passage and the injection port; causing the silicone to flow into the substantially ring-shaped silicone injection space sequentially through the disc flow passage and across an inner periphery of the substantially ring-shaped silicone injection space; and causing the silicone that has flowed into the substantially ring-shaped silicone injection space to flow in a direction that conforms to a shape of the silicone-flow deflection region.

According to the present invention, there is provided a personal ornament molding die set including: a substantially ring-shaped silicone injection space; an injection passage including an injection port located substantially at a vicinity of a center of an inner circle of the substantially ring-shaped silicone injection space, and configured to allow silicone to be injected through the injection port; a disc flow passage having a substantially disc-like shape expanding from the injection port toward the inner circle, and a thickness smaller than a thickness of the substantially ring-shaped silicone injection space; and a silicone-flow deflection region that is located in the substantially ring-shaped silicone injection space and deflects the silicone.

Further, according to the present invention, there is provided a personal ornament manufactured by: a first step of forming metal flakes through gold beating of metal; a second step of forming the metal flakes obtained in the first step into metal powder; a third step of adding the metal powder obtained in the second step into silicone, and of mixing the metal powder and the silicone with each other through kneading with use of a roll; a fourth step of injecting the silicone obtained in the third step into a die set; and a fifth step of taking out, from the die set in which the silicone is injected in the fourth step, a personal ornament made of the silicone, the die set including: a substantially ring-shaped silicone injection space; an injection passage including an injection port located substantially at a vicinity of a center of an inner circle of the substantially ring-shaped silicone injection space, and configured to allow the silicone to be injected through the injection port; a disc flow passage having a substantially disc-like shape expanding from the injection port toward the inner circle, and a thickness smaller than a thickness of the substantially ring-shaped silicone injection space; and a silicone-flow deflection region that is located in the substantially ring-shaped silicone injection space and deflects the silicone, the fourth step including: causing the silicone obtained in the third step to flow into the disc flow passage sequentially through the injection passage and the injection port; causing the silicone to flow into the substantially ring-shaped silicone injection space sequentially through the disc flow passage and across an inner periphery of the substantially ring-shaped silicone injection space; and causing the silicone that has flowed into the substantially ring-shaped silicone injection space to flow in a direction that conforms to a shape of the silicone-flow deflection region.

According to the present invention, there is provided a personal ornament manufacturing method including: a first step of forming metal flakes through gold beating of metal; a second step of forming the metal flakes obtained in the first step into metal powder; a third step of adding the metal powder obtained in the second step into silicone, and of mixing the metal powder and the silicone with each other through kneading with use of a roll; a fourth step of injecting the silicone obtained in the third step into a die set; and a fifth step of taking out, from the die set in which the silicone is injected in the fourth step, a personal ornament made of the silicone.

DESCRIPTION OF EMBODIMENTS

Figure 1:
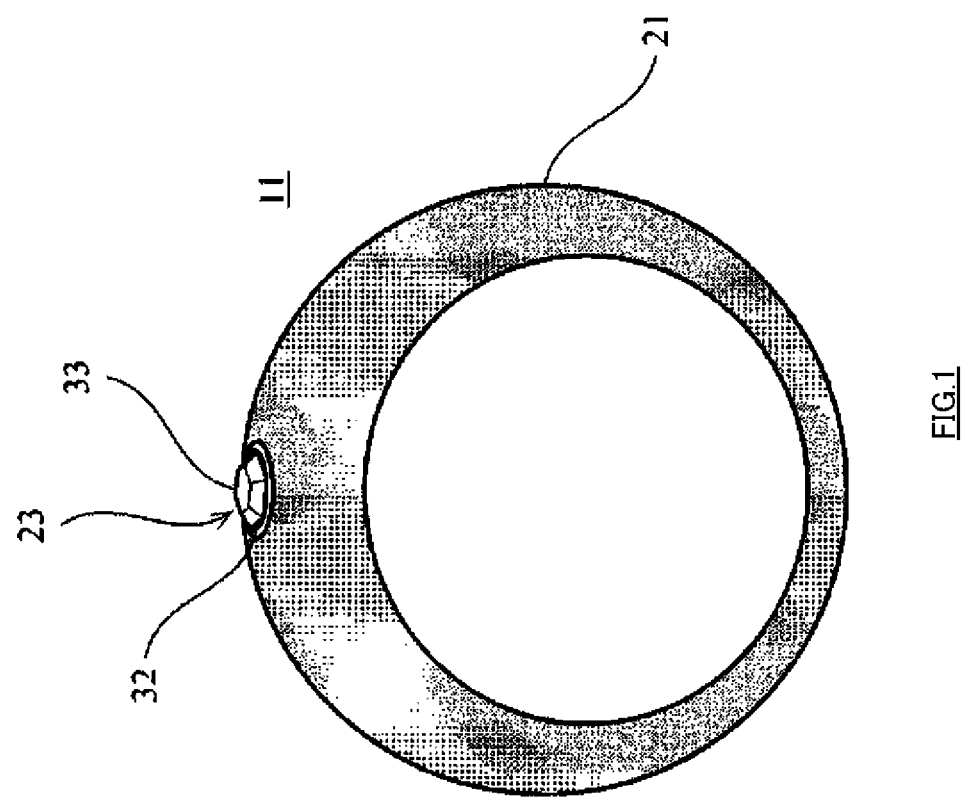
FIG. 1 is a perspective view of a one-size-fits-all ring according to the present invention.

Below, an embodiment for providing a one-size-fits-all ring according to the present invention is described in detail.

In the embodiment illustrated in FIG. 1 to FIG. 5, a one-size-fits-all ring 11 of the present invention includes a ring body 21 made of silicone rubber, and a collet 23 fitted into a cylindrical hole 22 formed at an appropriate position through the ring body 21. Thus, the one-size-fits-all ring 11 according to the present invention has elasticity of the silicone rubber as a preform. By virtue of this feature, the one-size-fits-all ring 11 can be worn even when a size of a finger of a wearer is somewhat larger or smaller than a size of the ring. Further, even when the size of the finger of the wearer varies, the one-size-fits-all ring 11 can be semipermanently worn.

The collet 23 fitted to the ring body 21 of the one-size-fits-all ring 11 includes an upper collet body 31, and an anti-falling large diameter portion 34 that is coupled to the collet body 31 with a narrow neck portion 35. In a recess part 32 formed in an upper surface of the collet body 31, a jewel 33 such as diamond is retained by appropriate means such as prong setting, bezel setting, and flush setting.

Further, as described above, the collet 23 includes the collet body 31 and the large diameter portion 34 that is coupled thereto with the narrow neck portion 35. In a manner that an inward flange portion 22a formed at a substantially intermediate position in the cylindrical hole 22 formed through the ring body 21 is fitted to the narrow neck portion 35, the collet 23 is fitted into the cylindrical hole 22 in the ring body 21.

Further, in the collet 23, the anti-falling large diameter portion 34 coupled to the collet body 31 with the narrow neck portion 35 is formed so as to have a diameter larger than that of the collet body 31. With this, the collet 23 does not easily drop off the ring body 21 made of the silicone rubber. As a matter of source, when the anti-falling large diameter portion 34 is formed so as to have the diameter larger than that of the collet body 31 in this way, there is no risk in that the collet 23 abuts in a small area against the finger of the wearer and causes pain.

Still further, in the collet 23, a rear surface of the anti-falling large diameter portion 34 coupled to the collet body 31 with the narrow neck portion 35 is formed into an arc shape in cross-section. With this, even when the collet 23 abuts against the finger of the wearer, there is no risk in that the collet 23 causes pain. In addition, at the time when the collet 23 is fitted into the cylindrical hole 22 formed through the ring body 21, the arc shape in cross-section allows the collet 23 to be naturally pushed into the hole 22.

Figure 2:
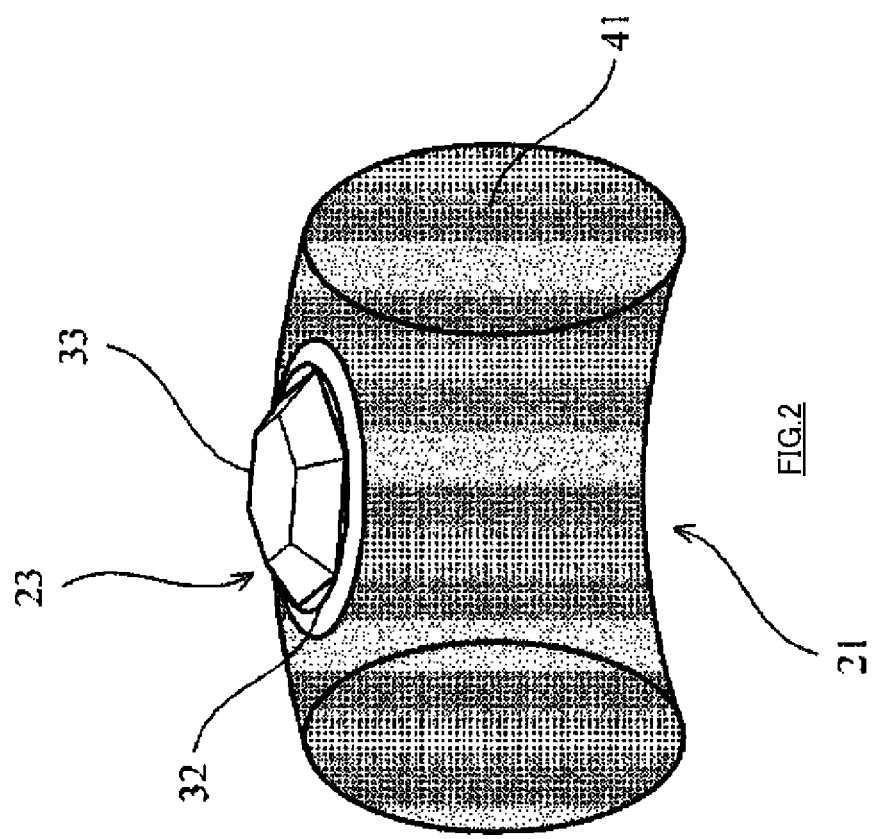
FIG. 2 is an enlarged perspective view of a shank of the one-size-fits-all ring according to the present invention.
Figure 3:
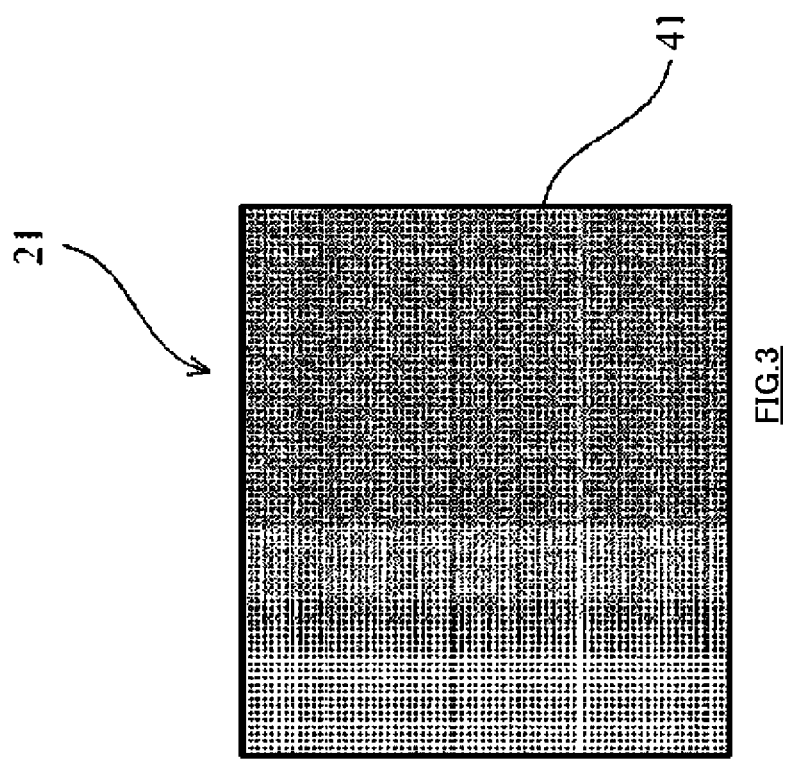
FIG. 3 is an enlarged schematic view of a part of the one-size-fits-all ring according to the present invention.

The silicone rubber of the ring body 21 illustrated in FIG. 1 to FIG. 3 is blended with of bare metal powder 41. As such bare metal powder 41, there may preferably be used powders of bare metals of precious metals such as gold, platinum, silver, and alloys of those precious metals, or powders of bare metals of metals such as copper.

Note that, the bare metal powder 41 is thoroughly and uniformly mixed into the ring body 21. Now, a blending example is given below.

Blending Example

A blending example of main components in 100 g of each of the members of the one-size-fits-all ring according to the present invention is given as follows.

Powder of bare metal of gold of approximately 0.08%
Silicone rubber preform of approximately 89.9%
Collet of approximately 10.0%
Jewel of approximately 0.02%

The blending rate of the bare metal in this case can be changed in accordance with types of products.

(a) The powder of the bare metal of gold to be mixed at approximately 0.08% is powder of pure gold having a purity of 97.66%.

(b) As the bare metal powder, powder of pure gold having a purity of 94.43% is mixed at approximately 0.06%, and powder of copper having a purity of 100% is mixed at 0.02%.

(c) Powder of pure platinum having a purity of 100% is mixed at approximately 0.04%.

In this way, through appropriate combinations of bare metal powders to be blended with the silicone rubber, desired color tones can be obtained.

In order that the bare metals are uniformly mixed into the silicone rubber preform not containing pigment, the bare metals need to be processed into micro-powder. When the bare metals are processed into the micro-powder, dies are scarcely affected, and hence the dies are not damaged. In addition, when the powders of the bare metals are mixed into the silicone rubber preform, the color tones to be obtained are different from those to be obtained in a case of using pigments. With this, atmospheres of the bare metals of their own can be obtained.

As a matter of course, depending on types and combinations of the bare metals, various types of products can be manufactured.

Meanwhile, in comparison with related-art accessories that are made only of precious metal materials, a use rate of the bare metals can be reduced. With this, light products can be manufactured at low cost. In addition, wearers who have not ever been able to enjoy wearing accessories such as a ring due to a metal allergy can prevent direct contact with the metals, and hence can enjoy the pleasure of wearing the accessories.

Now, a method of manufacturing the ring body 21 made of the above-described silicone rubber is made.

Figure 6:
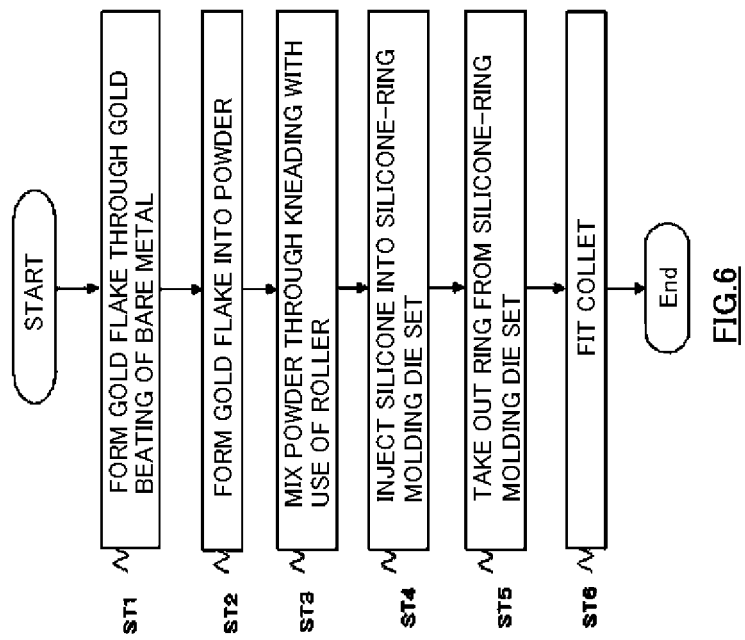
FIG. 6 is a flowchart showing a method of manufacturing a ring body 21 according to an embodiment of the present invention.

FIG. 6 is a flowchart showing the method of manufacturing the ring body 21 according to the embodiment of the present invention.

Step ST1:

Gold flakes are formed through gold beating of bare metal.

In order to form the bare metal into the gold flakes, the gold beating includes flattening the bare metal, which has a size of 1 cm$^2$, into a size of approximately 10 mm$^2$. The flattening of the bare metal includes beating and thinning.

Step ST2;

The gold flakes obtained in Step ST1 are crumbled by being kneaded, for example, together with molten animal glue. In this way, gold powder is obtained. Particles of the gold powder have, for example, a thickness of approximately 0.3 microns and a lateral length of approximately 3 microns.

Step ST3:

The gold powder obtained in Step ST2 is mixed with silicone not containing pigment through kneading with use of a roller.

Through mixing with use of the roller, frictional heat is generated. As a result, static electricity is generated to cause dust to be mixed into the silicone. When temperature of the silicone reaches approximately 50° C. by the frictional force, the silicone is softened.

Figure 7:
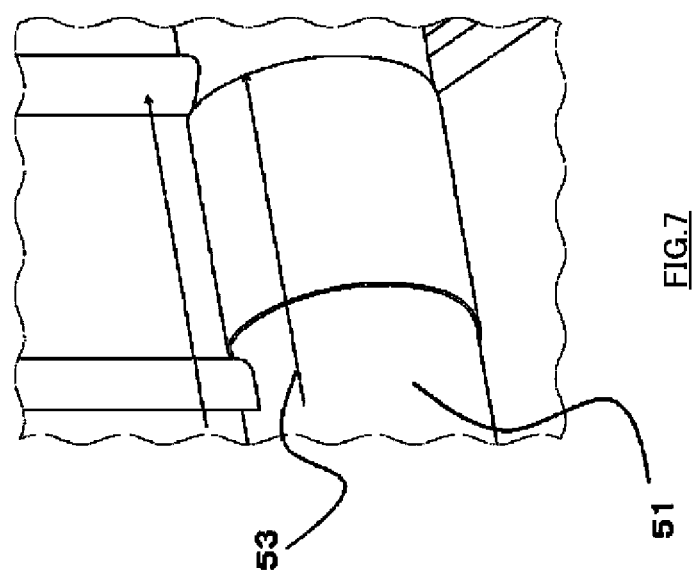
FIG. 7 is a view for illustrating a system of causing cooling water to flow onto a roll bar of a roller.
Figure 8:
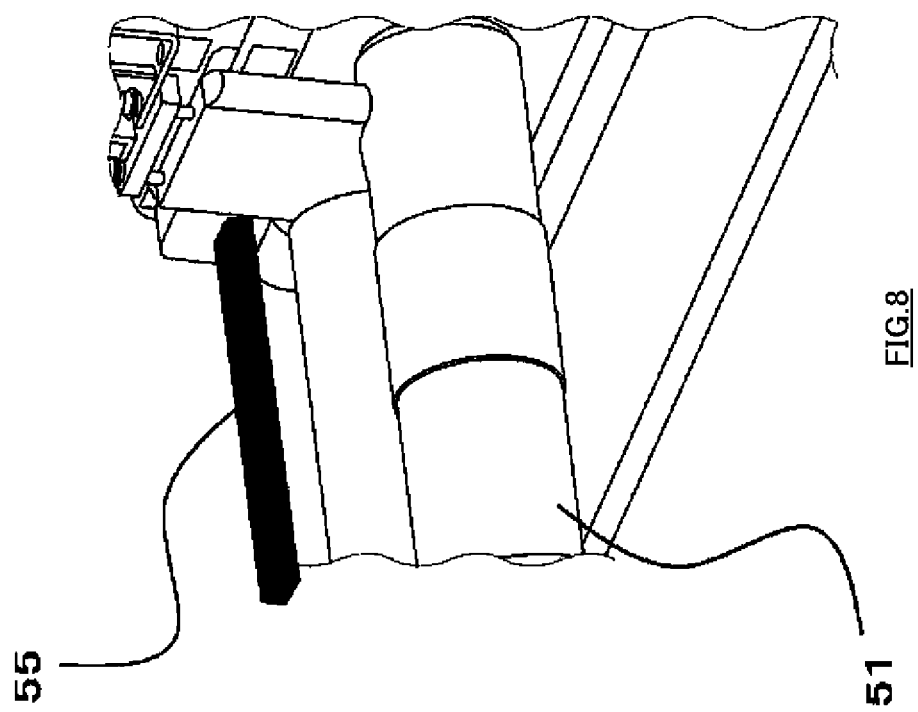
FIG. 8 is a view for illustrating a static eliminator.

FIG. 7 is a view for illustrating a system of causing cooling water to flow onto a roll bar of the roller. FIG. 8 is a view for illustrating a static eliminator.

In this embodiment, as illustrated in FIG. 7. cooling water 53 is caused to flow onto a roll bar 51 of the roller so as to reduce the frictional heat. In addition, as illustrated in FIG. 8, a static eliminator 55 is installed above the roll bar 51 so as to reduce the static electricity.

The static eliminator 55 is configured to supply ions with a good balance in accordance with charge amounts. With this, static elimination can be efficiently performed.

Figure 9:
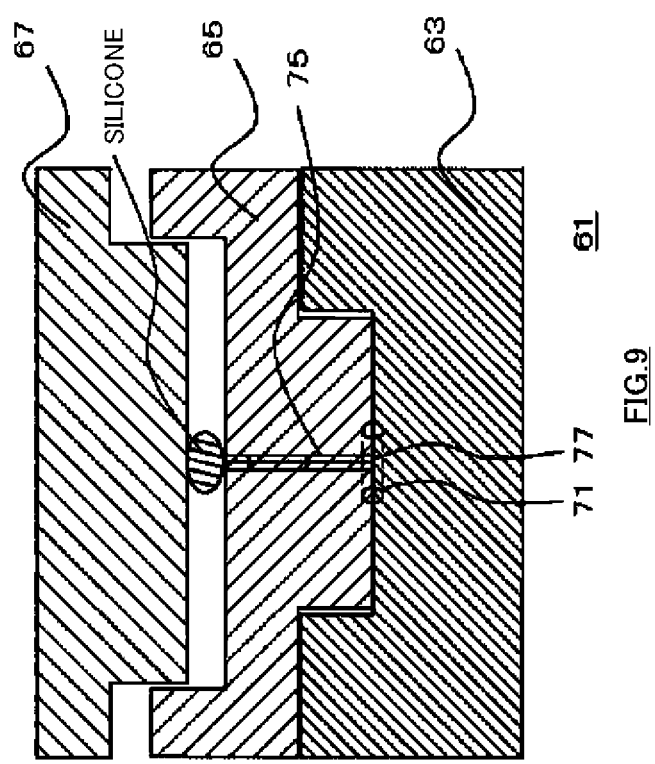
FIG. 9 is a sectional structural view for illustrating a silicone-ring molding die set.

Step ST4:

The silicone obtained in Step ST3 is injected into a silicone-ring molding die set 61 illustrated in FIG. 9. A process of Step ST4, which is executed with use of the silicone-ring molding die set 61, is described in detail below.

Step ST5:

When a predetermined time period elapses and the silicone is cooled, a silicone ring is taken out of the silicone-ring molding die set 61.

Step ST6:

The collet 23 is fitted and fixed to the hole 22 of the silicone ring.

Below, the silicone-ring molding die set 61 is described.

Figure 10:
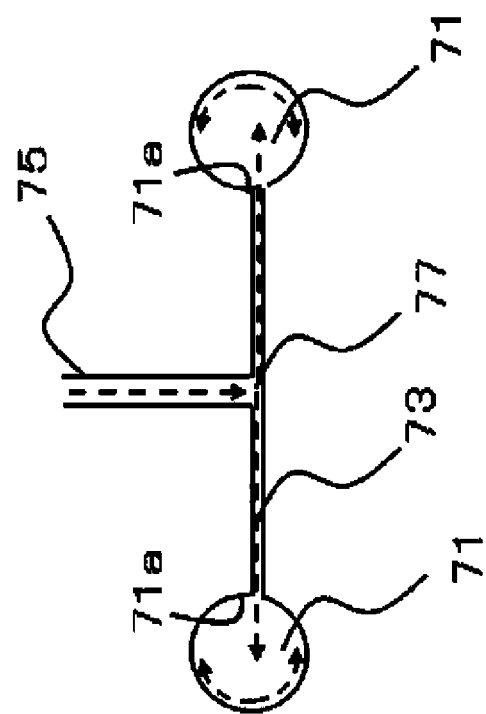
FIG. 10 is an enlarged sectional view of a vicinity of a silicone injection space in the silicone-ring molding die set illustrated in FIG. 9.

FIG. 9 is a sectional structural view for illustrating the silicone-ring molding die set 61. FIG. 10 is an enlarged sectional view of a vicinity of a silicone injection space in the silicone-ring molding die set 61 illustrated in FIG. 9.

As illustrated in FIG. 9, the silicone-ring molding die set 61 includes a lower die 63, an upper die 65, and an injection-pressing rubber-lid upper die 67.

As illustrated in FIG. 10, the lower die 63 and the upper die 65 are provided with a silicone injection space 71, a disc silicone-flow passage 73, and a silicone injection passage 75.

The silicone injection space 71 refers to a substantially ring-shaped space for allowing the silicone to flow therethrough and forming the ring body 21 of the one-size-fits-all ring 11 illustrated in FIG. 1.

The disc silicone-flow passage 73 has a substantially disc-like shape expanding from an injection port 77 located substantially at a vicinity of a center of an inner circle of the silicone injection space 71 toward an inner periphery 71a of the silicone injection space 71, and has a thickness smaller than that of the silicone injection space 71 (thickness in the upper-and-lower direction in FIG. 10).

Figure 11:
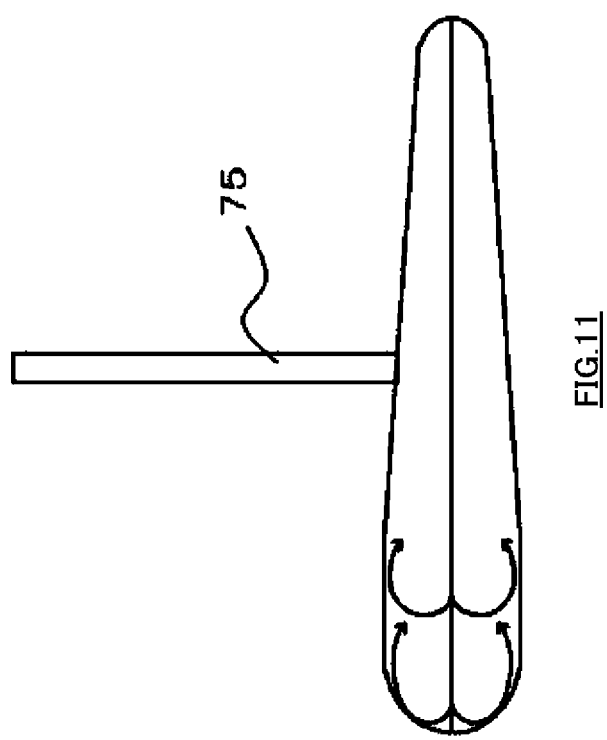
FIG. 11 is a view for illustrating a silicone injection passage.

As illustrated in FIG. 9, FIG. 10, and FIG. 11, the silicone injection passage 75 is extended in a direction orthogonal to a radial direction of the inner circle along the inner periphery 71a of the disc silicone-flow passage 73 such that the silicone is injected into the disc silicone-flow passage 73 through the injection port 77 formed at a leading end.

Figure 12:
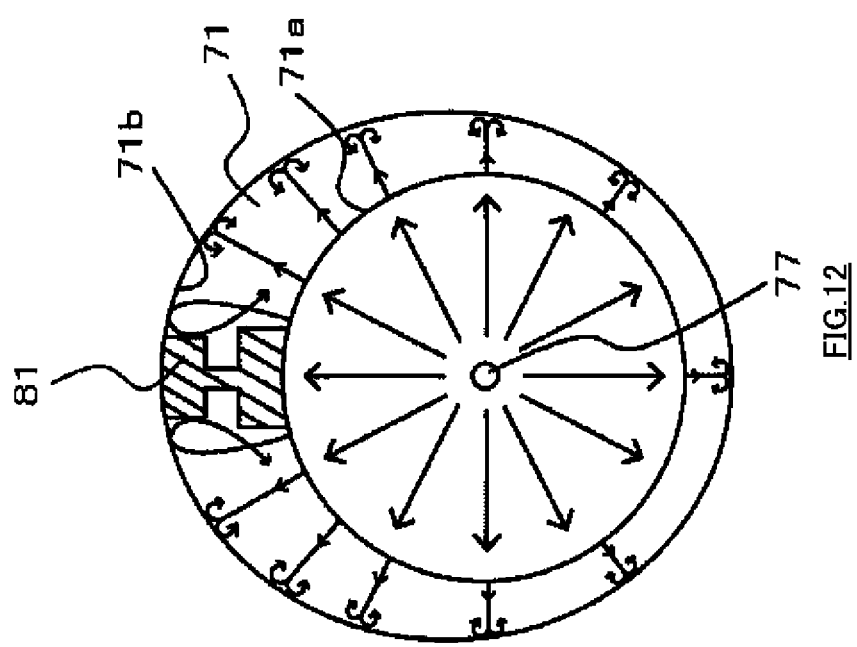
FIG. 12 is a view for illustrating shapes of the silicone injection space and a silicone-flow deflection region in a planar direction.

Further, as illustrated in FIG. 12, in the silicone injection space 71, there is formed a silicone-flow deflection region 81 that deflects the silicone having flowed into the silicone injection space 71 through the disc silicone-flow passage 73.

Figure 13:
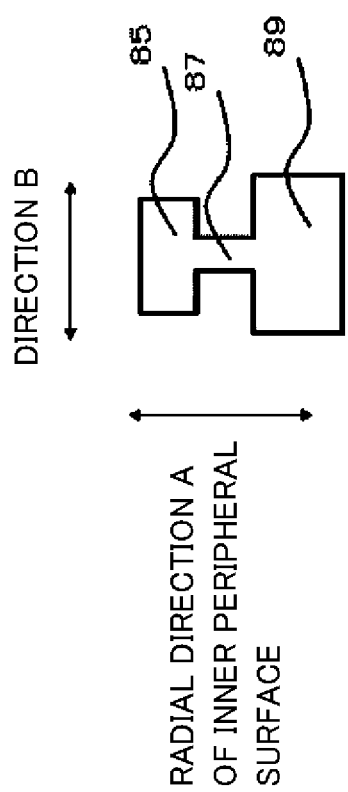
FIG. 13 is a view for illustrating the shape of the silicone-flow deflection region in the silicone-ring molding die set.

As illustrated in FIG. 13, in the radial direction A of the inner circle along the inner periphery 71a, the silicone-flow deflection region 81 includes a substantially columnar first region 85 having a first diameter in the direction B orthogonal to the radial direction, a columnar second region 87 having a second diameter smaller than the first diameter in the direction B, and a columnar third region 89 having a third diameter larger than the first diameter in the direction B. Note that, the first region 85, the second region 87, and the third region 89 are coaxial with each other.

In addition, in the radial direction A, the silicone-flow deflection region 81 is formed across the inner periphery 7a and an outer periphery of the silicone injection space 71.

Figure 4:
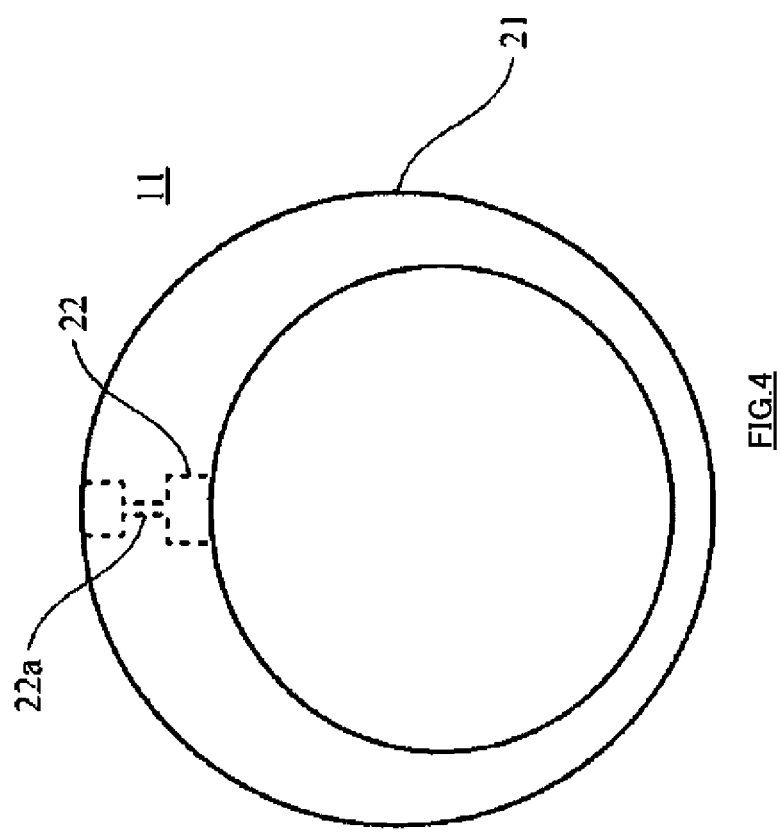
FIG. 4 is a schematic side view of a shape of a recess part configured to allow a collet of the one-size-fits-all ring according to the present invention to be fitted thereto.
Figure 5:
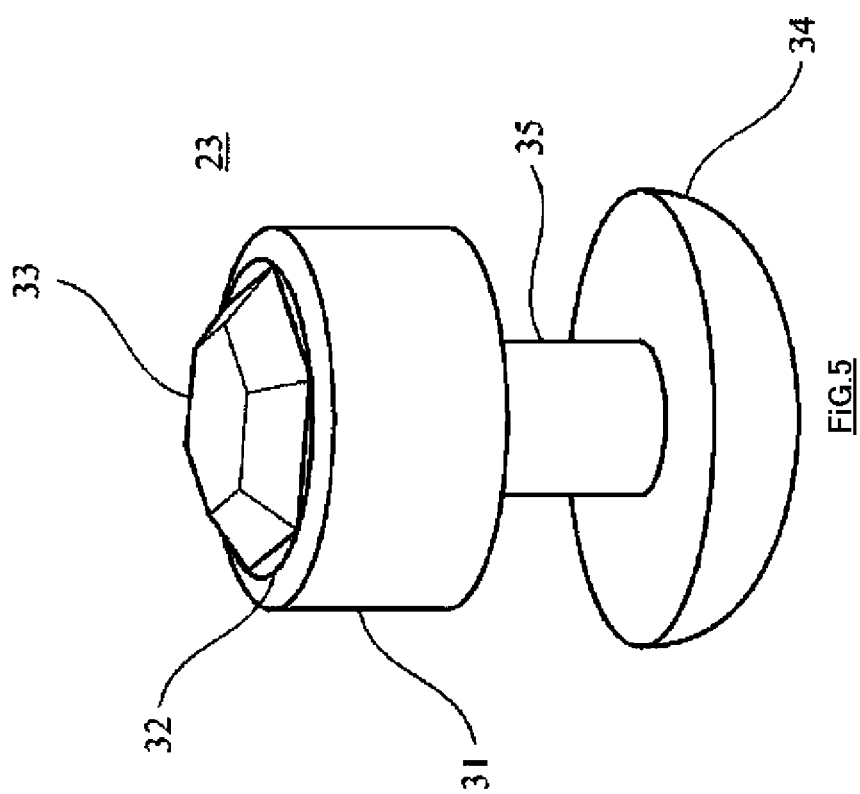
FIG. 5 is a perspective view of the collet of the one-size-fits-all ring according to the present invention.

The silicone-flow deflection region 81 is arranged so as to form, as illustrated in FIG. 4, the hole 22 of the one-size-fits-all ring 11. The second region 87 is arranged so as to form the flange portion 22a.

The process of Step ST4 shown in FIG. 6 is described in detail.

As illustrated in FIG. 9, silicone 93 is placed between the upper die 65 and the injection-pressing rubber-lid upper die 67, and the silicone injection passage 75 is pressurized by the injection-pressing rubber-lid upper die 67. With this, the silicone 93 is caused to flow into the injection port 77 through the silicone injection passage 75.

Then, sequentially through the injection port 77 and the disc silicone-flow passage 73, the silicone is caused to flow toward the inner periphery 71a of the silicone injection space 71.

Next, on the inner periphery 71a, the silicone flows in directions of the arrows shown in FIG. 11 and FIG. 12.

Further, as described above, as in the illustrations of the first region 85, the second region 87, and the third region 89, the silicone-flow deflection region 81 has the different diameters. With this, the silicone flows between both circumferential sides of the silicone-flow deflection region 81. In this way, the silicone flows in a peculiar manner in conformity with a shape of the silicone-flow deflection region 81. As a result, a pattern of the one-size-fits-all ring 11 is formed.

According to the method of this embodiment, which includes manufacturing the ring body 21 made of the silicone rubber, the bare metal is not ground but formed into the gold flakes (Step ST1 in FIG. 6). The gold flakes are formed into powder through kneading (Step ST2), and the gold powder thus obtained is kneaded with use of the roller (Step ST3). With this, the gold flakes are formed like pieces of folded paper within the ring body 21. In this way, with a small amount of bare metal, the ring body 21 can be colored in gold.

In other words, in a method of mixing powder of ground bare metal into the silicone, gold after the mixing remains agglomerated, and hence the silicone is not colored in gold without a larger amount of bare metal than in this embodiment.

In this embodiment, by executing the processes of Step ST1 to 3 described above, the gold ring body 21 can be manufactured with a small amount of gold.

According to the method of this embodiment, which includes manufacturing the ring body 21 made of the silicone rubber, the above-described silicone-ring molding die set 61 is used. With this, burrs are prevented from being formed along an outer peripheral region being an important region from a viewpoint of aesthetic properties of the one-size-fits-all ring 11. As a result, commercial value of the one-size-fits-all ring 11 can be enhanced.

According to the above-described silicone-ring molding die set 61, and to the method of this embodiment, which includes manufacturing the ring body 21 made of the silicone rubber, as described with reference to FIG. 9 to FIG. 12, sequentially through the injection port 77 located substantially at the vicinity of the center of the inner circle of the silicone injection space 71, and through the disc silicone-flow passage 73, the silicone is caused to flow toward the inner periphery 71a of the silicone injection space 71. With this, as illustrated in FIG. 12, the silicone can be caused to flow from the inner periphery 71a to the outer periphery 71b, and to impinge on and rebound back from the outer periphery 71b. By those flows, beautiful curved patterns can be formed all over the one-size-fits-all ring 11.

Further, according to the above-described silicone-ring molding die set 61, and to the method of this embodiment, which includes manufacturing the ring body 21 made of the silicone rubber, sequentially through the injection port 77 located at the center of the inner periphery 71a and through the disc silicone-flow passage 73, the silicone can be injected into the silicone injection space 71. With this, the silicone can be injected into the entire region along the inner periphery 71a of the silicone injection space 71. Thus, the silicone can be prevented from jamming during the inflow, and the silicone can be thoroughly distributed. As a result, a yield can be increased.

Further, according to the silicone-ring molding die set 61 and the manufacturing method of this embodiment, as described above, the silicone-flow deflection region 81 is formed of the first region 85, the second region 87, and the third region 89. With this, the silicone is caused to flow from one of both the circumferential sides of the silicone-flow deflection region 81 to another. Thus, the flows conforming to the shape of the silicone-flow deflection region 81 can be formed. In this way, the peculiar and characteristic pattern conforming to the shape of the silicone-flow deflection region 81 can be formed all over the one-size-fits-all ring 11.

The present invention is not limited to the above-described embodiment.

Specifically, those skilled in the art may make various modifications, combinations, sub-combinations, and alterations of the components of the above-described embodiment within the technical scope of the present invention or the equivalents thereof.

More specifically, with regard to a center of the inner periphery 71a and a center of the outer periphery 71b of the silicone injection space 71, which are displaced from each other in the case exemplified in the above-described embodiment, eccentricity between those centers may be arbitrarily set. Thus, those centers may be aligned with each other.

Further, the shape of the silicone-flow deflection region 81 is not limited to the shape exemplified in this embodiment within the scope of the present invention, which scope is specified in "Claims."

Still further, instead of the gold that is exemplified as the metal of the present invention in the above-described embodiment, there may be employed other metals such as copper and platinum, and metals formed through mixing of a plurality of metals.

Yet further, the personal ornament of the present invention is not limited to the ring exemplified in the above-described embodiment, and may include other personal ornaments such as a pendant.

INDUSTRIAL APPLICABILITY

The present invention is applicable, for example, to a method of manufacturing a silicone ring.

REFERENCE SIGNS LIST 11 one-size-fits-all ring
21 ring body
22 hole
22a inward flange portion
23 collet
31 collet body
32 recess part
33 jewel
34 large diameter portion
35 narrow neck portion
41 bare metal
61 silicone-ring molding die set
63 lower die
65 upper die
67 injection-pressing rubber-lid upper die
71 silicone injection space
73 disc silicone-flow passage
75 silicone injection passage
81 silicone-flow deflection region

The invention claimed is:

1. A personal ornament manufacturing method comprising:
  a first step of forming metal flakes through gold beating of metal;
  a second step of forming the metal flakes obtained in the first step into metal powder;
  a third step of adding the metal powder obtained in the second step into silicone, and of mixing the metal powder and the silicone with each other through kneading with use of a roll;
  a fourth step of injecting the silicone obtained in the third step into a die set; and
  a fifth step of taking out, from the die set in which the silicone is injected in the fourth step, a personal ornament made of the silicone,
  the die set comprising:
    a substantially ring-shaped silicone injection space;
    an injection passage including an injection port located substantially at a vicinity of a center of an inner circle of the substantially ring-shaped silicone injection space, and configured to allow the silicone to be injected through the injection port;
    a disc flow passage having
      a substantially disc-like shape expanding from the injection port toward the inner circle, and
      a thickness smaller than a thickness of the substantially ring-shaped silicone injection space; and
    a silicone-flow deflection region that is located in the substantially ring-shaped silicone injection space and deflects the silicone,
  the fourth step including:
    causing the silicone obtained in the third step to flow into the disc flow passage sequentially through the injection passage and the injection port;
    causing the silicone to flow into the substantially ring-shaped silicone injection space sequentially through the disc flow passage and across an inner periphery of the substantially ring-shaped silicone injection space; and
    causing the silicone that has flowed into the substantially ring-shaped silicone injection space to flow in a direction that conforms to a shape of the silicone-flow deflection region.

2. A personal ornament method of manufacturing, comprising:
  a first step of forming metal flakes through gold beating of metal;
  a second step of forming the metal flakes obtained in the first step into metal powder;
  a third step of adding the metal powder obtained in the second step into silicone, and of mixing the metal powder and the silicone with each other through kneading with use of a roll;
  a fourth step of injecting the silicone obtained in the third step into a die set; and
  a fifth step of taking out, from the die set in which the silicone is injected in the fourth step, a personal ornament made of the silicone,
  the die set including:
    a substantially ring-shaped silicone injection space;
    an injection passage including an injection port located substantially at a vicinity of a center of an inner circle of the substantially ring-shaped silicone injection space, and configured to allow the silicone to be injected through the injection port;
    a disc flow passage having
      a substantially disc-like shape expanding from the injection port toward the inner circle, and
      a thickness smaller than a thickness of the substantially ring-shaped silicone injection space; and
    a silicone-flow deflection region that is located in the substantially ring-shaped silicone injection space and deflects the silicone,
  the fourth step including:
    causing the silicone obtained in the third step to flow into the disc flow passage sequentially through the injection passage and the injection port;
    causing the silicone to flow into the substantially ring-shaped silicone injection space sequentially through the disc flow passage and across an inner periphery of the substantially ring-shaped silicone injection space; and causing the silicone that has flowed into the substantially ring-shaped silicone injection space to flow in a direction that conforms to a shape of the silicone-flow deflection region.

* * * * *